US012375987B2

(12) United States Patent
Watfa et al.

(10) Patent No.: US 12,375,987 B2
(45) Date of Patent: Jul. 29, 2025

(54) METHOD AND APPARATUS FOR IMPROVEMENTS IN AND RELATING TO MANAGEMENT OF A DISASTER CONDITION IN A MOBILE COMMUNICATION SYSTEM

(71) Applicant: Samsung Electronics Co., Ltd., Suwon-si (KR)

(72) Inventors: Mahmoud Watfa, Staines (GB); Lalith Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 17/651,546

(22) Filed: Feb. 17, 2022

(65) Prior Publication Data

US 2022/0264403 A1    Aug. 18, 2022

(30) Foreign Application Priority Data

Feb. 17, 2021   (IN) .............................. 202131006564
Feb. 15, 2022   (GB) ...................................... 2201977

(51) Int. Cl.
*H04W 36/06*  (2009.01)
*H04W 4/90*   (2018.01)
*H04W 8/22*   (2009.01)
*H04W 76/50*  (2018.01)

(52) U.S. Cl.
CPC ............. *H04W 36/06* (2013.01); *H04W 4/90* (2018.02); *H04W 8/22* (2013.01); *H04W 76/50* (2018.02)

(58) Field of Classification Search
CPC ......... H04W 36/06; H04W 4/90; H04W 8/22; H04W 76/50; H04W 8/24; H04W 60/00
See application file for complete search history.

(56) References Cited

U.S. PATENT DOCUMENTS

2010/0317348 A1   12/2010  Burbidge et al.
2011/0188411 A1*   8/2011  Faccin .................. H04W 76/10
                                                              370/259

(Continued)

FOREIGN PATENT DOCUMENTS

WO        2020213816 A1    10/2020

OTHER PUBLICATIONS

United Kingdom Intellectual Property Office, "Combined Search and Examination Report under Sections 17 and 18(3)," Jul. 12, 2022, in connection with Untied Kingdom Patent Application No. GB2201977.2, 6 pages.

(Continued)

*Primary Examiner* — Christine Ng (57) ABSTRACT

The disclosure relates to a 5G or 6G communication system for supporting a higher data transmission rate. A method performed by a terminal in a wireless communication system is provided. The method includes transmitting, to a network entity associated with a first network system, a registration request message for a disaster roaming service, the registration request message including capability information of the terminal, transmitting, to the network entity, a service request message for an emergency service using a second network system, and after the emergency service ends, performing a cell reselection to return to the first network system providing the disaster roaming service.

14 Claims, 5 Drawing Sheets

(56) References Cited

U.S. PATENT DOCUMENTS

| | | | | |
|---|---|---|---|---|
| 2012/0034910 | A1* | 2/2012 | Fang | H04W 36/00224 |
| | | | | 455/422.1 |
| 2012/0287937 | A1* | 11/2012 | Kaya | H04L 45/28 |
| | | | | 370/401 |
| 2017/0358196 | A1* | 12/2017 | Jang | G08B 21/10 |
| 2020/0275332 | A1 | 8/2020 | Chong et al. | |
| 2021/0022049 | A1 | 1/2021 | Ke | |
| 2021/0224880 | A1* | 7/2021 | Scholl | G06K 7/1413 |
| 2022/0038879 | A1* | 2/2022 | Won | H04W 76/38 |
| 2022/0070814 | A1* | 3/2022 | Chun | H04W 8/02 |
| 2022/0070815 | A1* | 3/2022 | Chun | H04W 60/04 |
| 2022/0078871 | A1* | 3/2022 | Won | H04W 76/27 |
| 2022/0167185 | A1* | 5/2022 | Kim | H04W 76/19 |
| 2022/0217519 | A1* | 7/2022 | Kim | H04W 4/12 |
| 2022/0217553 | A1* | 7/2022 | Kim | H04W 24/04 |
| 2023/0043232 | A1* | 2/2023 | Ryu | H04W 76/27 |
| 2023/0156553 | A1 | 5/2023 | Kim et al. | |
| 2024/0007878 | A1* | 1/2024 | Starsinic | H04W 48/10 |

OTHER PUBLICATIONS

3GPP TS 22.261 V18.1.0 (Dec. 2020); Technical Specification; 3rd Generation Partnership Project; Technical Specification Group Services and System Aspects; Service requirements for the 5G system; Stage 1 (Release 18); 85 pages.

International Search Report and Written Opinion of the International Searching Authority dated May 13, 2022, in connection with International Application No. PCT/KR2022/002355, 7 pages.

Huawei et al., "Discussion on solutions for KI#2 and KI#6 for Mint," C1-210208, 3GPP TSG CT WG1 Meeting #127bis-e, e-meeting, Jan. 25-29, 2021, 7 pages.

3GPP TR 24.811 V0.2.0 (Feb. 2021) Technical Report; 3rd Generation Partnership Project; Technical Specification Group Core Network and Terminals; Study on the support for minimization of service interruption; (Release 17); 79 pages.

"3rd Generation Partnership Project; Technical Specification Group Core Network and Terminals; Study on the support for minimization of service interruption; (Release 17)", 3GPP TR 24.811 V0.1.0 (Dec. 2020), 14 pages.

"3rd Generation Partnership Project; Technical Specification Group Services and System Aspects; Service requirements for the 5G system; Stage 1 (Release 17)", 3GPP TS 22.261 V17.3.0 (Jul. 2020), 83 pages.

"3rd Generation Partnership Project; Technical Specification Group Radio Access Network; NG-RAN; NG Application Protocol (NGAP) (Release 16)", 3GPP TS 38.413 V16.4.0 (Jan. 2021), 473 pages.

"3rd Generation Partnership Project; Technical Specification Group Core Network and Terminals; Non-Access-Stratum (NAS) protocol for 5G System (5GS); Stage 3; (Release 17)", 3GPP TS 24.501 V17.1.0 (Dec. 2020), 769 pages.

Examination Report dated Jan. 4, 2024, in connection with United Kingdom Patent Application No. 2201977.2, 4 pages.

Supplementary European Search Report dated Jun. 10, 2024, in connection with European Patent Application No. 22756519.9, 10 pages.

Samsung: "Solution to KI#4: Confining a Disaster Inbound Roamer UE's area of service to the area of the disaster condition", C1-210307, 3GPP TSG-CT WG1 Meeting #127bis-e, Jan. 2021, 3 pages.

* cited by examiner

METHOD AND APPARATUS FOR IMPROVEMENTS IN AND RELATING TO MANAGEMENT OF A DISASTER CONDITION IN A MOBILE COMMUNICATION SYSTEM

CROSS-REFERENCE TO RELATED APPLICATION

This application is based on and claims priority under 35 U.S.C. § 119 to Indian Patent Application No. 202131006564 filed on Feb. 17, 2021, in the Indian Intellectual Property Office, and United Kingdom Patent Application No. 2201977.2 filed on Feb. 15, 2022, in the UK Intellectual Property Office, the disclosures of which are herein incorporated by reference in their entirety.

BACKGROUND

1. Field

In a Disaster Condition, DC, where some or all of a network is adversely affected by a disaster, User Equipments, UEs, from the DC-affected network may, in a controlled manner and with some conditions applied, register temporarily with another network. Controls are required to prevent the other network from being overwhelmed.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Embodiments of the present disclosure relate to confining a UE (or a terminal) to an area and/or Core Network Type in the event of a Disaster Condition.

TS 22.261 lists some requirements to avoid service interruptions that may arise when a disaster condition e.g., fire, occurs on a given Public Mobile Land Network, PLMN, and for which the UEs are to be redirected to another PLMN in a manner that keeps the service interruption to a minimum. The description of this can be found in TS 22.261:

"A mobile network may fail to provide service in the event of a disaster (for example a fire.) The requirements listed in this clause provide the 5GS with the capability to mitigate interruption of service. UEs may obtain service in the event of a disaster, if there are PLMN operators prepared to offer service. The minimization of service interruption is constrained to a particular time and place. To reduce the impact to the 5G System of supporting Disaster Roaming, the potential congestion resulting from an influx or outflux of Disaster Inbound Roamers is taken into account."

As can be seen from the above, the service interruption is limited to a particular time and place and hence only the UEs that are in the given location at the given time of disaster will be impacted by the disaster condition and hence should be serviced by another PLMN.

The following detailed requirements are also listed in TS 22.261:

"6.31.2 Requirements
6.31.2.1 General

Subject to regulatory requirements or operator's policy, 3GPP system shall be able to enable a UE of a given PLMN to obtain connectivity service (e.g., voice call, mobile data service) from another PLMN for the area where a Disaster Condition applies.

6.31.2.2 Disaster Condition

The 3GPP system shall enable UEs to obtain information that a Disaster Condition applies to a particular PLMN or PLMNs.

NOTE: If a UE has no coverage of its HPLMN, then obtains information that a Disaster Condition applies to the UE's HPLMN, the UE can register with a PLMN offering Disaster Roaming service.

The 3GPP system shall support means for a PLMN operator to be aware of the area where Disaster Condition applies.

The 3GPP system shall be able to support provision of service to Disaster Inbound Roamer only within the specific region where Disaster Condition applies.

The 3GPP system shall be able to provide efficient means for a network to inform Disaster Inbound roamers that a Disaster Condition is no longer applicable.

Subject to regulatory requirements or operator's policy, the 3GPP system shall support a PLMN operator to be made aware of the failure or recovery of other PLMN(s) in the same country when the Disaster Condition is applies, or when the Disaster Condition is not applicable.

6.31.2.3 Disaster Roaming

The 3GPP system shall be able to provide means to enable a UE to access PLMNs in a forbidden PLMN list if a Disaster condition applies and no other PLMN is available except for PLMNs in the forbidden PLMN list.

The 3GPP system shall provide means to enable that a Disaster Condition applies to UEs of a specific PLMN.

The 3GPP system shall be able to provide a resource efficient means for a PLMN to indicate to potential Disaster Inbound Roamers whether they can access the PLMN or not.

Disaster Inbound Roamers shall perform network reselection when a Disaster Condition has ended.

The 3GPP system shall minimize congestion caused by Disaster Roaming.

3GPP system shall be able to collect charging information for a Disaster Inbound Roamer with information about the applied disaster condition."

TR 24.811 is the specification that is used to perform the study based on these requirements. TR 24.811 captures key issues for which solutions will be developed and chosen for normative work when the study concludes.

It is assumed that a disaster condition can occur on the Radio Access Network, RAN, level for which e.g., the radio towers will be non-functional and hence the UE cannot connect to the PLMN in the area where the DC occurred. For example, consider FIG. 1 which shows examples of RAN nodes 10, 20, 30 that connect to the Access and Mobility Management Function 40, AMF, of the PLMN.

Figure 1:
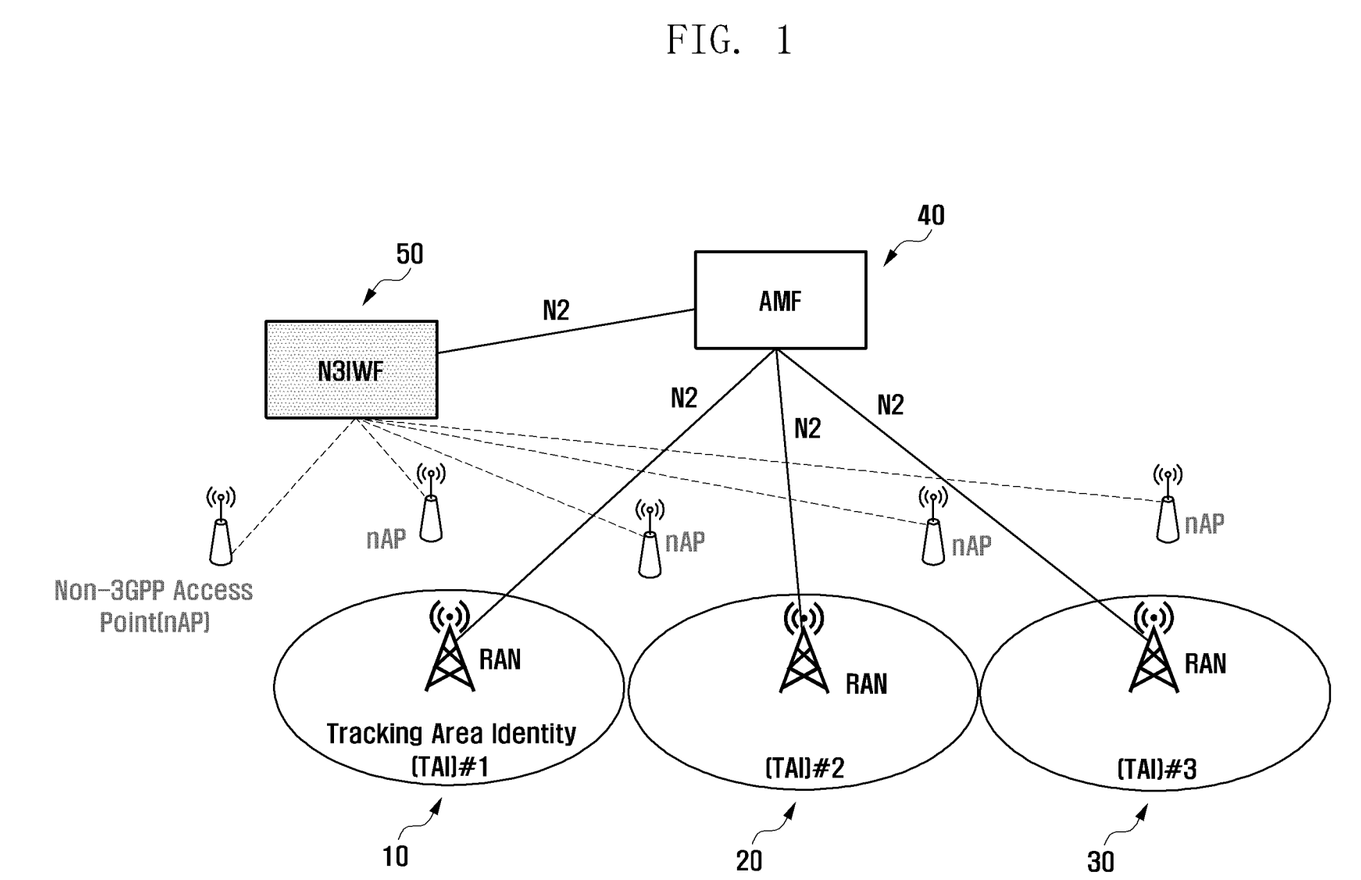
FIG. 1 shows a schematic of a network according to the prior art showing several RANs.

Normally, every cell (or RAN node, which may support multiple cells) broadcasts the Tracking Area Identity (TAI), or actually a Tracking Area Code (TAC) in addition to the PLMN identity which, together, form the TAI of the cell. The UE identifies the PLMN ID (or TAI) of a cell based on this information that is broadcast.

Note that PLMN ID=Mobile Country Code (MCC)+Mobile Network Code (MNC), and TAI=PLMN ID+Tracking Area Code (TAC)=MCC+MNC+TAC A UE that registers to the 5GS will be provided with a registration area, RA, which consists of a set of TAIs (i.e., one or more TAI) into which the UE is allowed to enter without performing a registration procedure, except for periodic updating or other reasons. For example, if a UE registers and receives an RA that is composed of TAI #1 and TAI #2 (associated with RAN 10 and RAN 20), then the UE can move from TAI #1 to TAI #2 in idle mode without sending a Registration Request. On the other hand, if the UE enters a new area that is not part of the UE's RA e.g., TAI #3 (associated with RAN 30), then the UE is required to perform a registration procedure in order to get services during which the network will provide a new RA assuming the UE is indeed allowed to use the service in TAI #3.

When a DC occurs, one or more of the RAN nodes may be down and, as such, the UE may not receive any broadcast information and, as such, may not be able to receive any system information that would otherwise enable the UE to determine the PLMN ID or the TAI of the cell. In fact, the UE would not detect a cell when this occurs. This assumes that the DC impacts the RAN such that no information can be sent by the RAN and, as such, the UE cannot detect the presence of the cell as per normal methods.

As indicated earlier, a DC may be limited to a certain place and time. It is possible that the DC impacts one or more TAIs such as: the area covered by TAI #1 only, or TAI #2 only, or TAI #3 only; or the area covered by one or more TAIs e.g., TAI #1 and TAI #2 only, or TAI #2 and TAI #3 only, or TAI #1 and TAI #2 and TAI #3.

Note that the above is just an example to explain the place where a DC may occur. Additionally, a TAI, or a set of TAIs, may also correspond to a particular geographic area that can be e.g., a set of geographical coordinates, where this set may for example define a particular shape such as a triangle, rectangle, or any other polygon, etc.

Figure 2:
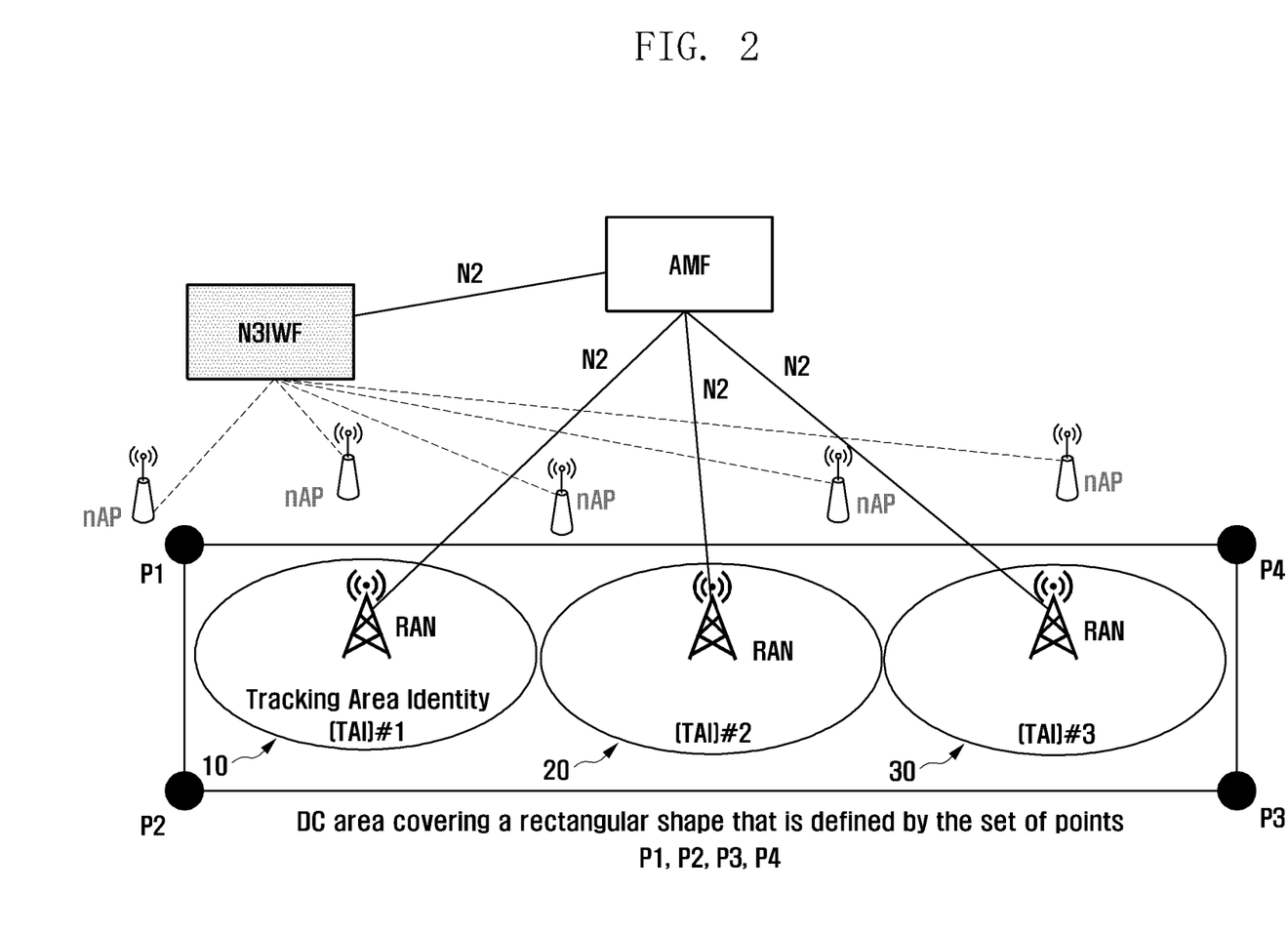
FIG. 2 shows a schematic of the network of FIG. 1 and the definition of a DC in a defined area.

For example, the DC may span all the TAIs shown in FIG. 2 such that the DC may be composed of a set of 4 coordinate points (P1, P2, P3, P4) that define a rectangular shape that covers the cells that broadcast TAI #1 to TAI #3.

When a DC occurs, and the UE is aware of it, the UE will attempt to register on another PLMN, where this PLMN may be a visited PLMN (VPLMN) i.e., the PLMN may not be the UE's home PLMN (HPLMN). In fact, the UE may be allowed to use a PLMN in the list of forbidden PLMNs that the UE maintains.

When the UE registers on another PLMN where there is no DC, the UE can receive services from that PLMN, e.g., a target VPLMN, until the DC in its source PLMN (e.g., HPLMN or a previous source VPLMN) ends. The UE can then return to the previous PLMN.

As the number of UEs that go to a target PLMN due to a DC, or return to a source PLMN after a DC ends, the requirements listed earlier require that this be done in a way that avoids congestion on a (target or source) PLMN that may result from a very large number of UEs attempting registration at the same time.

In the prior art, there is no reliable way to ensure that roaming UEs can only get service in a confined area, as a result of a DC. Reference was made earlier to the requirement that "The 3 GPP system shall be able to support provision of service to Disaster Inbound Roamer only within the specific region where Disaster Condition applies."

The requirement above can somehow be met in 5GS, i.e., if the UE remains in 5GS or N1 mode, by using service area lists that define a set of TAIs where service is allowed. Although not very granular, the use of a service area list can generally define a broad area within which the service area can be confined.

However, the concept of service area list is not support in Evolved Packet System, EPS, or in S1 mode, so if the UE goes to the EPS of the PLMN that is providing disaster roaming service, then the UE's service area cannot be confined to a specific area (corresponding to the area of the disaster condition). To be able to confine the area of service in the EPS there will be need for additional changes to the nodes in the EPS e.g., changes will be required at least to the Mobility Management Entity, MME, and possibly the RAN.

Figure 3:
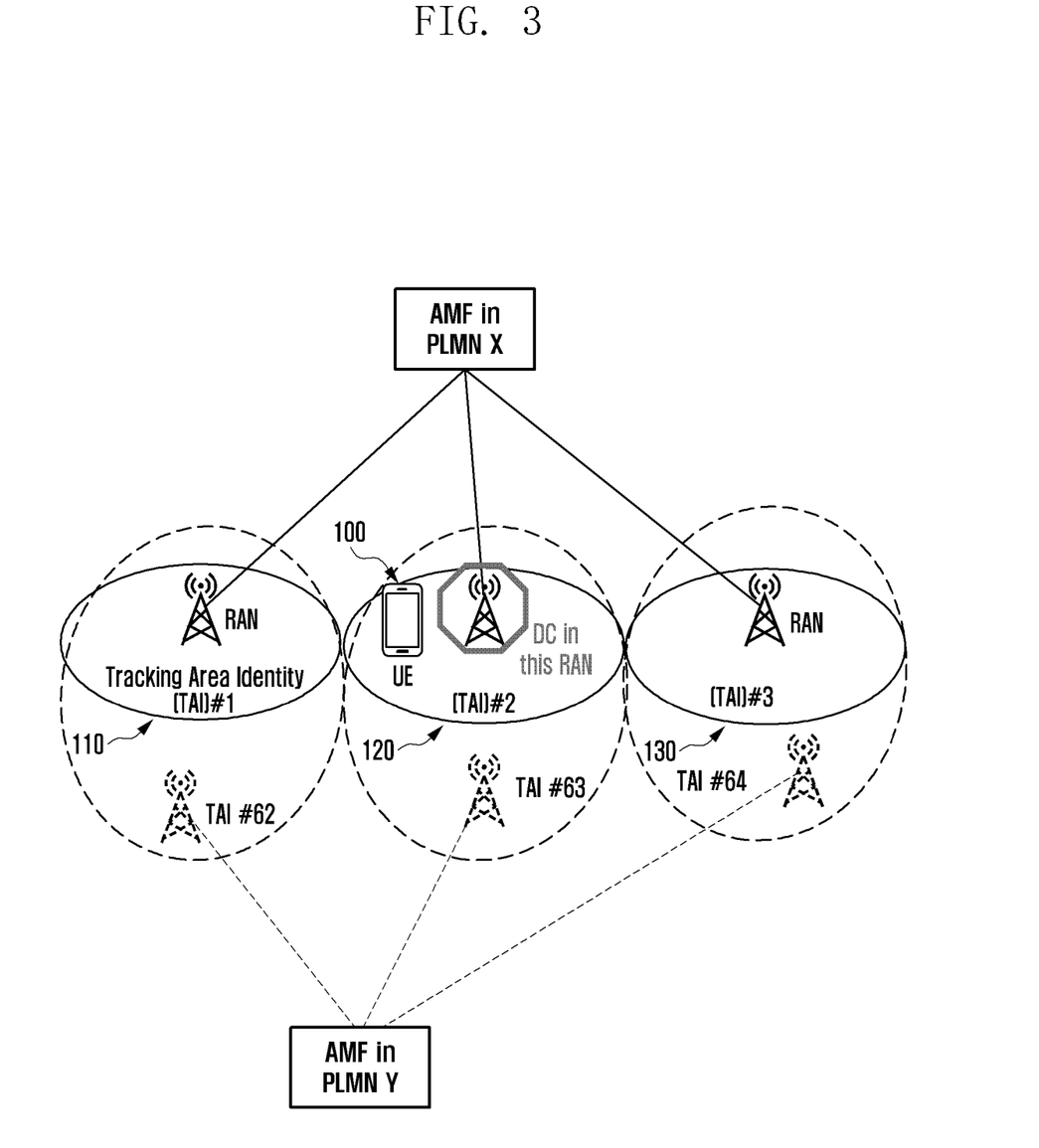
FIG. 3 illustrates a schematic of a DC area in a first that overlaps with a coverage area of a second network not affected by the DC according to embodiments of the present disclosure.

For example, looking at FIG. 3, assume that the cells and TAIs #1, #2 and #3 belong to a given PLMN, say PLMN X. Now, assume PLMN X experiences a disaster condition that impacts the RAN node 120 which broadcasts TAI #2. In this case, the UE 100 may attempt to register onto PLMN Y where the coverage of PLMN Y overlaps with that of PLMN X. However, PLMN Y needs to ensure that the UE 100 will only use services from PLMN Y within the area of the DC in PLMN X. In this case, for example, since the DC only affects TAI #2, associated with RAN 120 and not RAN 110 and RAN 130 of PLMN X, then the UE 100 should only be allowed to use services in the overlapping area which is TAI #63 of PLMN Y.

Note that the TAIs shown above are assumed to be TAIs of the 5GS of PLMN Y. However, PLMN Y may also have EPS (or LTE) coverage where other TAIs may also exist and potentially overlap with TAIs of the 5GS. These TAIs are not shown in the figure.

To summarize, there is no solution known in the prior art that ensures that if a UE accesses the EPS of a target PLMN, which is not affected by a DC, then the UE can only use services in an area which overlaps with the area of a DC in the 5GS system of an affected PLMN.

It is an aim of embodiments of the present disclosure to address shortcomings in the prior art, whether identified herein or not.

SUMMARY

According to the present disclosure there is provided an apparatus and method as set forth in the appended claims. Other features of the disclosure will be apparent from the dependent claims, and the description which follows.

In accordance with an aspect of the disclosure, a method performed by a terminal in a wireless communication system is provided. The method includes transmitting, to a network entity associated with a first network system, a registration request message for a disaster roaming service, the registration request message including capability information of the terminal, transmitting, to the network entity, a service request message for an emergency service using a second network system, and after the emergency service ends, performing a cell reselection to return to the first network system providing the disaster roaming service.

In accordance with an aspect of the disclosure, a method performed by a network entity associated with a first network system in a wireless communication system is provided. The method includes receiving, from a terminal, a registration request message for a disaster roaming service, the registration request message including capability information of the terminal, and receiving, from the terminal, a service request message for an emergency service using a second network system. After the emergency service ends, a cell reselection to return to the first network system providing the disaster roaming service is performed.

In accordance with an aspect of the disclosure, a terminal in a wireless communication system is provided. The terminal includes a transceiver and a controller. The controller is configured to transmit, to a network entity associated with a first network system via the transceiver, a registration request message for a disaster roaming service, the registration request message including capability information of the terminal, transmit, to the network entity via the transceiver, a service request message for an emergency service using a second network system, and after the emergency service ends, perform a cell reselection to return to the first network system providing the disaster roaming service.

In accordance with an aspect of the disclosure, a network entity associated with a first network system in a wireless communication system is provided. The network entity includes a transceiver and a controller. The controller is configured to receive, from a terminal via the transceiver, a registration request message for a disaster roaming service, the registration request message including capability information of the terminal, and receive, from the terminal via the transceiver, a service request message for an emergency service using a second network system. After the emergency service ends, a cell reselection to return to the first network system providing the disaster roaming service is performed.

According to a first aspect of the present invention, there is provided a method of managing a User Equipment, UE, such that it is only provided with service from a telecommunication network during a Disaster Condition, in a defined area, comprising the steps of: a) the UE not indicating support for S1 mode upon registration with the telecommunication network when the UE is registering for disaster roaming service; orb) the UE indicating its support for S1 mode and the network is operable to prevent a handover to the UE in S1 mode for a UE which is registered for disaster roaming service.

In an embodiment, in case a), the UE sets the S1 mode bit, EPC NAS supported bit, to "S1 mode not supported" in the 5GMM capability IE of the REGISTRATION REQUEST message.

In an embodiment, the UE disables S1 mode.

In an embodiment, the UE enables S1 mode if at least one of the following circumstances:
 the UE needs to place an emergency service or call;
 the UE needs to perform emergency services fallback; and
 the UE needs to place an emergency call using circuit switched fallback.

In an embodiment, after completing the emergency service or call, the UE attempts to return to a 5GS domain of the telecommunication network to resume disaster roaming.

In an embodiment, the UE autonomously uses any RAT that supports the Circuit Switched domain, and performs network search or selection using that RAT so as to place an emergency call.

In an embodiment, in case b), if the UE sends a Service Request message, then an AMF of the telecommunication network allow the request, due to it being for emergency services, and allows the UE to use EPS by either executing a handover or an idle mode reselection.

In an embodiment, in order to avoid handover or idle mode reselection, the AMF: stores a local flag or indication that specifies that the UE should not be handed over to EPS or to S1 mode even if the UE supports S1 mode; or indicate to a Radio Access Network, RAN, of the telecommunication network that the UE is not permitted to use EPC; or if the UE is accessing the 5GC over NR, and the telecommunication network which is providing inbound disaster roaming service is only allowed to provide service to the UE via NR, then the AMF indicates to the RAN that E-UTRA(N) is a forbidden RAT for the UE.

Although a few preferred embodiments of the present disclosure have been shown and described, it will be appreciated by those skilled in the art that various changes and modifications might be made without departing from the scope of the disclosure, as defined in the appended claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In a first embodiment, the UE does not indicate support of S1 mode when it registers with a target PLMN, which does not have a disaster condition.

When the UE registers with a PLMN that does not have a disaster condition, optionally where the UE is registering to obtain disaster roaming services (e.g., optionally the UE is registering with a target PLMN due to a disaster condition on its source PLMN, or the UE is registering with a target PLMN after determining that the PLMN accepts and/or allows disaster inbound roamers), the UE should not indicate that it supports S1 mode, even if the UE actually supports S1 mode. As such, the UE should set the S1 mode bit (or the EPC NAS supported bit) to "S1 mode not supported" in the 5GMM capability IE of the REGISTRATION REQUEST message even if the UE does support S1 mode.

Optionally, and/or additionally, the UE should disable its S1 mode. Optionally if the UE is accessing the target PLMN using NR access technology, the UE may optionally disable its E-UTRA capability.

The disabling of S1 mode, or optionally the disabling of E-UTRA mode (e.g., when the UE is accessing 5GC of the target PLMN using NR access), ensures that the UE remains in 5GS of the target PLMN, so that the target PLMN may use methods such as, but not limited to, service area list or other methods to confine the UE's service area to the area of the disaster condition.

The UE may later enable S1 mode and/or E-UTRA capability under any of the following conditions, in any combination: the UE needs to place an emergency service or call and optionally the current PLMN does not support emergency services over N1 mode; the UE needs to perform emergency services fallback (optionally after the UE determining that emergency services fallback is supported by the network based on the information received in the Emergency services fallback indicator for 3GPP access (EMF) of the 5GS network feature support IE the UE needs to place an emergency call using circuit switched fallback and/or over any other CS domain (e.g., in A mode or Iu-CS mode) or any other PS domain such as EPS (or Gb mode and/or Iu-PS mode).

Alternatively, if the UE supports the circuit switched (CS) domain (e.g., A mode or Iu mode e.g., Iu-CS mode), the UE may, upon the need to place a CS emergency call, autonomously reselect (using the access technology for that mode) to a cell and/or PLMN that supports the CS domain to place the emergency call. For example, the UE may autonomously use any RAT that supports the CS domain (e.g., a cell over which the UE operates in A mode or Iu-CS mode) and perform PLMN selection on using that RAT so as to place the emergency call. Note that the emergency call may also be a packet switched (PS) emergency call that can be placed over Gb mode (e.g., GERAN/GPRS) or Iu-PS mode (e.g., UMTS).

If the UE determines that the PLMN that is providing disaster roaming service does provide emergency services fallback, the UE may, upon a need to use emergency services or, optionally, when the UE determines to use emergency services fallback (e.g., knowing that the UE supports emergency services fallback and the network also does support emergency service fallback to EPC), take any of the following actions.

Firstly, the UE may enable S1 mode, or E-UTRA access capability, and send a Registration Request message indicating the support of S1 mode by setting the S1 mode bit to "S1 mode supported" in the 5M/1 W capability IE. After the registration procedure is complete, the UE may initiate the service request procedure (and send a Service Request message, or Control Plane Service Request message) and request emergency services fallback by setting the service type IE or control plane service type IE to indicate "emergency services fallback".

Secondly, the UE may autonomously reselect to a cell (e.g., E-UTRA cell) that connects to EPC over which the UE can operate in S1 mode and requests emergency services Thirdly, when or if the UE, for any of the proposals herein, reselects to the CS domain (e.g., A mode or Iu-CS mode) or PS domain (e.g., S1 mode, Gb mode, or Iu-PS mode) of a forbidden PLMN, the UE may perform an emergency registration e.g., emergency attach in the EPS (or attach for emergency services), even if it was normally registered on the 5GS system of the same (e.g., forbidden) PLMN. Note that the actual name of the registration may vary for each mode, but the proposal is that the UE optionally registers such that the only service it can get is emergency. For example, in a CS domain e.g., A mode or Iu-CS mode, the UE may send a CM Service Request with the CM service type set to "Emergency call establishment" where this may be done after performing an IMSI attach, for instance.

Fourthly, when the UE ends the emergency call on the CS domain or PS domain of another system that is not 5GS (e.g., CS domain of GPRS or UMTS system, or PD domain of the EPS), the UE should, as quickly as possible, return to the 5GS domain (i.e., N1 mode) of the PLMN where disaster inbound roaming service was being received (or any other PLMN that may be selected for disaster roaming service) or where the UE was registered for disaster roaming services. The UE may reselect back to 5GS of the PLMN that provides disaster roaming service when the emergency calls and optionally when the UE is in idle mode of that system. Returning to the obtain disaster roaming service may also imply performing PLMN selection to select a PLMN where disaster roaming service can be obtained on 5GS (N1 mode), where the PLMN selected may or may not be the same as the previous PLMN where disaster roaming service was used, however it is preferable to return to the same PLMN that provided disaster roaming service. The UE may then disable S1 mode again as proposed herein e.g., upon return to the PLMN where disaster roaming service was provided before the emergency call or upon selection of another PLMN that provides disaster roaming service.

Note that the details set out above apply even if the UE reselects to any other domain for emergency services where the emergency service may not be just because (or via) emergency services fallback.

As such, when the UE is in a target system such as GERAN, UMTS, EPS, etc, for the purpose of placing an emergency call, either via CS domain or PS domain of that system, optionally where that domain is not 5GS of the PLMN where the UE was registered for disaster roaming services, the UE should, upon termination of the emergency service, attempt to return (as fast as possible) to the 5GS domain of the PLMN where the UE was registered for disaster roaming service. The UE may perform cell reselection and/or PLMN (re-)selection to return to the PLMN, and 5GS domain, to resume the disaster roaming service. In this step, the UE may also select another PLMN that provides disaster roaming service if needed.

Optionally, if the UE knows that TAIs and/or Routing area identities (RAIs) and/or Location area identities (LAIs) of a target system where these TAIs and/or LAIs as known to overlap with the area of the disaster condition, then the UE, when in these systems, can monitor its location relative to these known TAIs and/or RAIs and/or LAIs. If the UE is outside of these TAIs and/or RAIs and/or LAIs, then the UE can deduce that it is no longer in the area of the disaster condition and, as such, can trigger PLMN selection to return to the original PLMN where a disaster condition was experienced.

To this end, when the UE is on a PLMN that provides disaster roaming service, optionally when the UE requests to use emergency services fallback or optionally during a registration procedure, the network (e.g., AMF) may provide a set of TAIs and/or RAIs and/or LAIs that are known to overlap with the area of the disaster condition. The determination of these areas is implementation-specific and beyond the scope of this application, but will be known to the skilled person. The network may provide this information in any NAS message or in any NAS container or policy container, etc. Note that this information will be kept by the UE when the UE accesses the target system and they should be kept in a separate list or entity such that they are not overridden by any other TAI and/or RAI and/or LAI that is provided by the core network of that system. The UE uses this information to determine if it is within a disaster condition area or not as described above. If the UE determines that it is out of the disaster area, by comparing the information received from the AMF of the 5GS in the PLMN that was provided disaster roaming service, versus the TAIs and/or RAIs and/or LAIs that is received from the target system (EPS S1 mode, Iu-PS mode, Iu-CS mode, etc), to determine if the UE is inside the area of the disaster condition or not. If the UE is outside the area of the disaster condition, then the UE may determine to go back to the original PLMN which previously had a disaster condition since the UE should be able to get normal service again in the original PLMN. If the UE determines that it is outside of the disaster condition area, then the UE should return to its original PLMN after the emergency call ends and as quickly as possible.

In a second embodiment, the UE indicates its support for S1 mode but the network avoids a handover to S1 mode.

In this solution, the UE indicates whether or not is supports S1 mode accordingly. If the UE does support S1 mode as indicated in the 5GMM capability IE, then the AMF avoids any handover of the UE, or idle mode reselection of the UE, such that the UE will remain on 5GS and not use the EPS (or EPC). An exception to this network behaviour may be when the UE needs to use emergency services in the EPS e.g., via the EPS services fallback. For example, the AMF may avoid handing over the UE to the EPS. However, if the UE sends a Service Request message (or Control Plane Service Request message) requesting emergency services fallback, then the AMF may allow the request due to it being for emergency services and may then allow the UE to go to the EPS by either executing a handover or an idle mode reselection.

To avoid handover or idle mode reselection for the UE as set out above, the AMF may take any of the following actions:

The AMF may store a local flag or indication that specifies that the UE is not handed over to the EPS or to S1 mode even if the UE supports S1 mode. For example, the AMF may make this determination for a UE optionally if the UE is registering (or has registered) for disaster roaming services, or the AMF can use the knowledge of the UE being a UE that is registered for disaster roaming services to further determine that such a UE should not be permitted to use the EPS, except for the case of emergency services or emergency services fallback The AMF may indicate to the RAN that the UE is not permitted to use EPC. This may be done by appropriately setting the 'Core Network Type Restriction for Serving PLMN' (of the Mobility Restriction List IE that is defined in TS 38.413, see TS 38.413) such that the EPC is indicated to be restricted. The AMF may also set the same information for equivalent PLMNs in the 'Core Network Type Restriction for Equivalent PLMNs' and the contained 'Core Network Type Restriction' component (i.e., the 'Core Network Type Restriction' of the 'Core Network Type Restriction for Equivalent PLMNs') of the Mobility Restriction List IE that is defined in TS 38.413.

If the UE is accessing the 5GC over NR, and the PLMN which is providing inbound disaster roaming service is only allowed to provide service to the UE via NR (e.g., based on subscription or local policies), the AMF may also indicate to the RAN (using the appropriate information element) that E-UTRA(N) is a forbidden RAT for the UE in question. The AMF may indicate this using the 'RAT Restriction Information' component of the 'RAT Restrictions' information element of the Mobility Restriction List IE that is defined in TS 38.413.

However, when the UE requests to use emergency services or emergency services fallback (to fallback to the EPS/EPC), or when the UE establishes a PDU session for emergency services, where this session may optionally be potentially transferred to the EPS or S1 mode, the AMF may remove any restriction that is listed above. The AMF may then update the RAN node such that any such restriction as listed above (or other mobility restriction) is removed. For example, the AMF may update the RAN with a new set of restrictions such that the UE will be allowed to use EPC and/or E-UTRA as needed for the purpose of the emergency service. The AMF may provide this updated information using the Mobility Restriction List IE that the AMF can send to the RAN using any N2 message e.g., Handover Request, INITIAL CONTEXT SETUP REQUEST, DOWNLINK NAS TRANSPORT, or any other N2 message (that is new or existing and) that can be used to carry the Mobility Restriction List IE.

To summarize, when the UE is using 5GS of a PLMN such that the UE is registered for roaming disaster service, the serving network e.g., AMF, should ensure that the UE does not access EPC (or optionally E-UTRA if the UE is accessing 5GC using NR, and/or if the network does not support E-UTRAN connected to 5GC). The AMF should ensure that it indicates to the RAN (e.g., using the Mobility Restriction List IE or any other IE) over any N2 message that the UE should not be allowed to use EPC, or optionally E-UTRA, in some conditions as stated above. The AMF should therefore set the restrictions for the related information elements (or components) accordingly e.g., AMF indicates that EPC is restricted in 'Core Network Type Restriction for Serving PLMN' and/or in the 'Core Network Type Restriction for Equivalent PLMNs'. When the UE requests emergency services (e.g., request a PDU session for emergency services) or emergency services fallback (to fallback to the EPS/EPC), or when the UE establishes a PDU session for emergency services, where this session may be transferred to the EPS or S1 mode, optionally if the request is to use emergency services fallback, and optionally if the network (e.g., AMF or serving PLMN) does not support emergency services in 5GS, then the AMF may determine to remove all mobility restrictions that are listed above, or other restrictions. The AMF may then update the RAN to now indicate that e.g., EPC is no longer restricted and/or E-UTRA is no longer restricted, in the appropriate IEs as listed earlier.

The following is not necessarily only related to S1 mode but rather related to confining the UE's service on 5GS to the area of the disaster condition, where the area is an area of the disaster condition in the source PLMN of the UE, where the PLMN is the PLMN that experienced a disaster condition. However few exceptions apply as will be described.

Note that even when the UE remains in 5GS on the PLMN (where the PLMN is the PLMN that is providing disaster roaming service), the AMF ensures that the UE can only receive services within an area that is overlapping with the area of the disaster condition as far as possible. Assuming that the AMF knows the area of the disaster condition in the UE's source PLMN (where this information is obtained using known methods that are not herein described), the AMF uses this information to determine which cells of the NG-RAN would overlap, or would match to or match with or correspond to, the area of the disaster condition. This may be done by implementation specific methods in the AMF. Having made such a determination, the AMF further determines the cells and optionally their cell identities (e.g., global cell identities) that would overlap with the disaster condition area of the source PLMN. Having made this determination, the AMF sets out the mobility restriction for the UE (for NR, or E-UTRA in the case the UE is accessing 5GC over E-UTRA) such that only the cells that are determined to overlap with the area of the disaster condition would be allowed for the UE. For example, only these cells would be allowed for the UE and, as such, the RAN should only perform mobility (e.g., handover) for the UE if the target cell is part of the identified cell. Therefore, when the AMF provides any N2 message to the RAN (e.g., such as those listed earlier), the AMF ensures that the mobility restrictions (using any of the components listed earlier e.g., in the Mobility Restriction List IE or any other IE that can be used for this purpose) will indicate the cells that are determined to overlap with the area of the disaster condition as the only cells that are permitted for the UE to get normal service. For example, having identified the cells that are allowed for the UE, where these cells are e.g., identified to overlap with the area of the disaster condition, the AMF determines the tracking area codes (TACs) that is/are broadcast by these cells. The AMF e.g., should indicate these TACs to be 'Allowed TACs' in the Service Area Information IE of the Mobility Restriction List IE.

Similarly, the AMF can determine which TACs (e.g., which cells broadcasts such TACs) are not allowed for the UE using a similar mechanism as described above. For example, by determining which cells are allowed for the UE (where these cells overlap with, or are confined to, the area of the disaster condition) the AMF can therefore deduce which cells are not allowed for the UE and can therefore also deduce the TACs that are not allowed for the UE as these cells may be known to broadcast particular TACs. For the cells and/or TACs that are determined to be not allowed for the UE e.g., because these cells that broadcast the determined TACs are not within the area of the disaster condition, the AMF may inform the RAN that these TACs are not allowed. For example, these TACs can be indicated to be not allowed using the 'Not Allowed TACs' field or IE in the Mobility Restriction List IE. Or these TACs (i.e., the TACs that are determined to be not allowed) can be indicated in the 'Forbidden TACs' field or IE in the Mobility Restriction List IE.

Similarly, when the UE requests to use emergency services on 5GS, or when the UE establishes a PDU session for emergency services, the AMF may remove one or more restriction for the UE. The AMF may update the RAN using any N2 message (e.g., as listed earlier) such as one or more restriction is removed. For example, the AMF may indicate that other TACs that were previously not allowed to be TACs that are currently allowed. For example, the AMF may also indicate an updated service area list which can contain more TACs that are allowed, etc. As such, in general, the listed mobility restrictions, or other mobility restrictions, including restrictions on EPC and/or E-UTRA as described earlier, can be temporary removed or ignored by the AMF such that the AMF updates the restrictions towards the RAN (using any N2 message) such that the UE can be allowed to use other cells that broadcast other TACs even if they are outside of the area of the disaster condition. This may be done to allow the UE to use emergency services.

Note that while allowing other areas and/or cells to be used for the UE during an emergency session/service (e.g., when a PDU session for emergency service is established), the AMF may initiate the release (or request the SMF to release) all other PDU sessions that are not a PDU session for emergency service. Furthermore, the AMF may inform the UE in the PDU session status IE that all other PDU sessions have been deactivated in the network.

Alternatively, the UE may autonomously release one or more PDU sessions that are not a PDU session for emergency service when the UE moves to an area, or uses a RAT or core network type, that is known to be not allowed for the UE. For example, if the UE requests to use emergency services on the EPS, or emergency services fallback, or if the UE autonomously reselects to the EPS, or a CS domain, or PD domain of UMTS, or GERAN, etc, then the UE may autonomously and/or locally release any or all other PDU sessions that are not a PDU session for emergency services. For example, if the UE has at least one PDU session on 5GS of the PLMN that is providing disaster roaming service, then when the UE accesses S1 mode (e.g., due to emergency services fallback, or UE autonomous reselection to S1 mode or E-UTRA as described herein e.g., after reactivation or re-enabling of S1 mode), then the UE may locally release each and every PDU session that is not a PDU session for emergency services. Alternatively, if the UE does not release such a session, the UE should not attempt to transfer the session to the EPS or another PS domain such as GERAN, UTRAN, etc. This ensures that other services are confined to 5GS of the PLMN where disaster roaming service is provided and also the service is confined to the area of the disaster condition.

For all of the embodiments described herein, when the emergency service ends, the AMF may then return to the original restrictions of mobility such that the UE's service can be confined to the area of the disaster condition. The AMF may then update the RAN with the updated restrictions. This may happen e.g., when the PDU session for emergency service is released, or when the UE returns from a target system after a request for emergency services fallback, etc.

Another embodiment ensures that PDU sessions that are not for emergency will not be transferred to the EPS, every such PDU session should not be allocated an EPS bearer ID by the network. As such, the UE will not get a corresponding EPS bearer ID for such a PDU session in the PDU Session Establishment Accept message (in the QoS rules IE or QoS flow descriptions IE or the Mapped EPS bearer context IE). Any of the following can be done to achieve this:

The subscription of the UE is updated to indicate whether or not a PDU session that is established in, or transferred to (e.g., from a source PLMN that had experienced disaster condition), a PLMN where disaster roaming service is provided, can be transferable to the EPS or not.

If the subscription indicates not, or based on local network policy (e.g., in the SMF), the SMF should not request (e.g., from the AMF) the allocation of an EPS bearer ID for a UE that is receiving disaster roaming services If the subscription indicates not, or based on local network policy (e.g., in the AMF), the AMF should not allocate an EPS bearer ID for a UE that is receiving disaster roaming services The UE may: be informed with any other method whether the PDU session is transferable to the EPS or not; be configured to transfer any such PDU session or not; or always determine that such a PDU session is transferable or not, based on a predetermined behaviour. Note that these apply even for the case when a PDU session was initiated indicated to be transferable (e.g., the UE had already received the EPS bearer ID as part of the PDU session establishment) to the EPS, where for example the PDU session is a session that was first established in a source PLMN (in which a disaster condition was experienced) and where the UE was informed that the session is transferable by virtue of e.g., receiving an EPS bearer ID in the 5GSM message of that session e.g., in the PDU Session Establishment Accept message For a session that was transferable from a source PLMN to the PLMN where the disaster roaming service is provided, the SMF (e.g., V-SMF or H-SMF) may perform a PDU session modification procedure such as to delete the EPS bearer ID that is related to each QoS flow and/or PDU session. This ensures that the PDU session will not be transferred to the EPS. Alternatively, the AMF or SMF may send any NAS message to the UE to indicate whether a PDU session is transferable or not, to the EPS, during access to disaster roaming service. Any NAS message and any IE can be used for this purpose. The UE can then, based on this information or other determination as proposed above, further determine if a session in question can be transferred to the EPS or not.

Note that the subscription of the UE and/or local policies in the PLMN that is providing disaster roaming service may indeed allow the transfer of sessions, even if they are not for emergency services, to the EPS. If this is the case, the network nodes may not necessarily perform some of the actions set out above and may for example allocate, or keep an allocated, EPS bearer ID.

It is however described that the network (e.g., AMF or SMF in the current serving PLMN or HPLMN) informs the UE whether or not such sessions can be transferred to the EPS and/or in general whether or not the UE can use the EPS for all services, or for emergency services only, or for a particular type of service. Alternatively, this information may be specific to a DNN, slice, or slice/DNN combination. The UE may use any of the above information to determine whether or not to transfer a session to the EPS. If a PDU session is determined to not be transferable e.g., based on the above, then the UE does not attempt to transfer the session to the EPS and may release it locally when the UE performs an inter-system change to S1 mode. The network e.g., AMF may provide a list of TAIs and/or RAIs and/or LAIs that the UE can use to determine that areas and/or cells where normal service can be used in e.g., S1 mode, Iu-CS modes, etc, as described earlier. If the UE is outside of these areas, it can assume to not be able to get normal service and may enter a new state e.g., limited state or any other state in which not all services can be obtained.

The UE may be preconfigured with any of the above information using preconfigurations or any other NAS message or container that the UE may receive and that may carry this information (or that the network may send to the UE, where the network may be a network node such as UDM, AMF, SMF, etc, where the node may be a node in the VPLMN or the HPLMN, and the network can use any NAS message or container to send the information to the UE). Based on this information the UE may determine if a session can be transferable to the EPS, and if not the UE may locally release the session when the UE performs an inter-system change to the EPS and may indicate the status of the session to be deactivated in the appropriate IE e.g., the EPS bearer status IE that the UE can send in either Attach Request or Tracking Area Update Request message.

Figure 4:
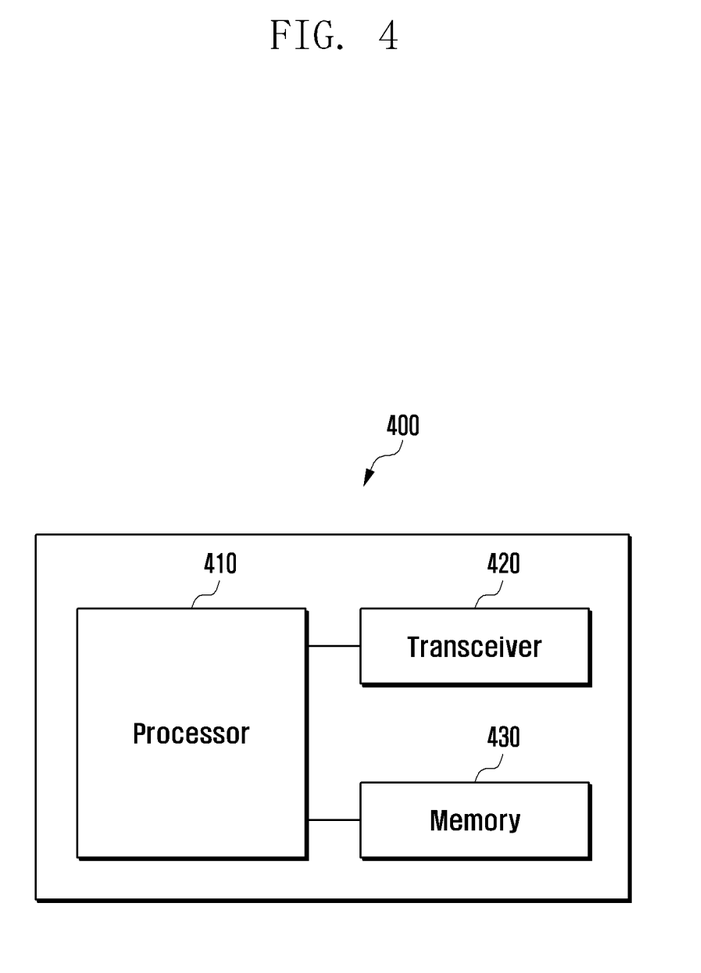
FIG. 4 illustrates a block diagram of a network entity according to embodiments of the present disclosure.

FIG. 4 illustrates a block diagram of a network entity according to embodiments of the present disclosure.

In one embodiment, the network entity may include an access and mobility management function (AMF).

Referring to FIG. 4, the network entity 400 may include a processor 410, a transceiver 420 and a memory 430. However, all of the illustrated components are not essential. The network entity 400 may be implemented by more or less components than those illustrated in FIG. 4. In addition, the processor 410 and the transceiver 420 and the memory 430 may be implemented as a single chip according to another embodiment.

The aforementioned components will now be described in detail.

The processor 410 may include one or more processors or other processing devices that control the proposed function, process, and/or method. Operation of the network entity 400 may be implemented by the processor 410.

The transceiver 400 may be connected to the processor 410 and transmit and/or receive a signal. The signal may include control information and data. In addition, the transceiver 420 may receive the signal and output the signal to the processor 410. The transceiver 420 may transmit a signal output from the processor 410.

The memory 430 may store the control information or the data included in a signal obtained by the network entity 400. The memory 430 may be connected to the processor 410 and store at least one instruction or a protocol or a parameter for the proposed function, process, and/or method. The memory 430 may include read-only memory (ROM) and/or random access memory (RAM) and/or hard disk and/or CD-ROM and/or DVD and/or other storage devices.

Figure 5:
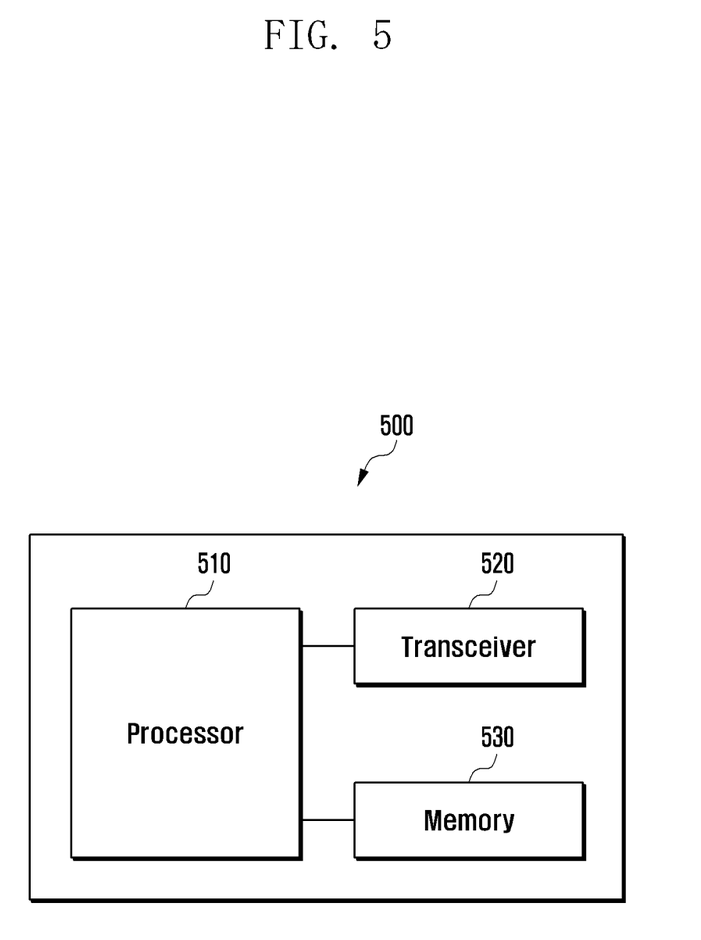
FIG. 5 illustrates a user equipment (UE) according to embodiments of the present disclosure.

FIG. 5 illustrates a user equipment (UE) according to embodiments of the present disclosure.

Referring to FIG. 5, the UE 500 may include a processor 510, a transceiver 520 and a memory 530. However, all of the illustrated components are not essential. The UE 500 may be implemented by more or less components than those illustrated in FIG. 5. In addition, the processor 510 and the transceiver 520 and the memory 530 may be implemented as a single chip according to another embodiment.

The aforementioned components will now be described in detail.

The processor 510 may include one or more processors or other processing devices that control the proposed function, process, and/or method. Operation of the UE 500 may be implemented by the processor 510.

The transceiver 520 may include a RF transmitter for up-converting and amplifying a transmitted signal, and a RF receiver for down-converting a frequency of a received signal. However, according to another embodiment, the transceiver 520 may be implemented by more or less components than those illustrated in components.

The transceiver 520 may be connected to the processor 510 and transmit and/or receive a signal. The signal may include control information and data. In addition, the transceiver 520 may receive the signal through a wireless channel and output the signal to the processor 510. The transceiver 520 may transmit a signal output from the processor 510 through the wireless channel.

The memory 530 may store the control information or the data included in a signal obtained by the UE 500. The memory 530 may be connected to the processor 510 and store at least one instruction or a protocol or a parameter for the proposed function, process, and/or method. The memory 530 may include read-only memory (ROM) and/or random access memory (RAM) and/or hard disk and/or CD-ROM and/or DVD and/or other storage devices.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent, or similar purpose, unless expressly stated otherwise. Thus, unless expressly stated otherwise, each feature disclosed is one example only of a generic series of equivalent or similar features.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
    identifying a disaster condition in a first public land mobile network (PLMN);
    transmitting, to an access and mobility management function (AMF) entity associated with a second PLMN, a first registration request message for a disaster roaming service, the first registration request message indicating that an S1 mode is not supported; and
    while registered for the disaster roaming service, based on an identification that an emergency service fallback is needed, transmitting, to the AMF entity, a second registration request message indicating that the S1 mode is supported.

2. The method of claim 1, further comprising transmitting, to the AMF entity, a service request message including service type information that indicates the emergency service fallback.

3. The method of claim 1, wherein the registration request further comprising obtaining an emergency service from a cell that connects to an evolved packet core (EPC).

4. The method of claim 1, wherein the emergency service fallback is supported by the terminal and the AMF entity.

5. A method performed by an access and mobility management function (AMF) entity associated with a first public land mobile network (PLMN) in a wireless communication system, the method comprising:
    in case that a disaster condition occurs in a second PLMN, receiving, from a terminal, a first registration request message for a disaster roaming service, the first registration request message indicating that an S1 mode is not supported; and
    while the terminal is registered for the disaster roaming service, receiving, from the terminal, a second registration request message associated with an emergency service fallback, the second registration request message indicating that the S1 mode is supported.

6. The method of claim 5, further comprising receiving, from the terminal, a service request message including service type information that indicates the emergency service fallback.

7. The method of claim 5, wherein the emergency service fallback is supported by the terminal and the AMF entity.

8. A terminal in a wireless communication system, the terminal comprising:
    a transceiver; and
    a controller coupled with the transceiver and configured to:
        identify a disaster condition in a first public land mobile network (PLMN),
        transmit, to an access and mobility management function (AMF) entity associated with a second PLMN, a first registration request message for a disaster roaming service, the first registration request message indicating that an S1 mode is not supported, and
        while registered for the disaster roaming service, based on an identification that an emergency service fallback is needed, transmit, to the AMF entity, a second registration request message indicating that the S1 mode is supported.

9. The terminal of claim 8, wherein the controller is further configured to transmit, to the AMF entity, a service request message including service type information that indicates the emergency service fallback.

10. The terminal of claim 8, wherein the controller is further configured to obtain an emergency service from a cell that connects to an evolved packet core (EPC).

11. The terminal of claim 8, wherein the emergency service fallback is supported by the terminal and the AMF entity.

12. An access and mobility management function (AMF) entity associated with a first public land mobile network (PLMN) in a wireless communication system, the AMF entity comprising:
    a transceiver; and
    a controller coupled with the transceiver and configured to:
        in case that a disaster condition occurs in a second PLMN, receive, from a terminal, a first registration request message for a disaster roaming service, the first registration request message indicating that an S1 mode is not supported, and
        while the terminal is registered for the disaster roaming service, receive, from the terminal, a second registration request message associated with an emergency service fallback, the second registration request message indicating that the S1 mode is supported.

13. The AMF entity of claim 12, wherein the controller is further configured to receive, from the terminal, a service request message including service type information that indicates the emergency service fallback.

14. The AMF entity of claim 12, wherein the emergency service fallback is supported by the terminal and the AMF entity.

* * * * *